United States Patent [19]
Forslund
[11] Patent Number: 4,485,546
[45] Date of Patent: Dec. 4, 1984

[54] METHOD AND APPARATUS FOR PACKING INSULATION MATERIAL IN HOLLOW BLOCKS

[75] Inventor: Lennart Forslund, Ljusdal, Sweden
[73] Assignee: Färila Lättblock AB, Färila, Sweden

[21] Appl. No.: 355,748
[22] PCT Filed: Jun. 17, 1981
[86] PCT No.: PCT/SE81/00182
§ 371 Date: Feb. 22, 1982
§ 102(e) Date: Feb. 22, 1982
[87] PCT Pub. No.: WO82/00041
PCT Pub. Date: Jan. 7, 1982

[30] Foreign Application Priority Data

Jun. 23, 1980 [SE] Sweden ............................... 8004635

[51] Int. Cl.[3] ........................ B23P 11/02; B23P 21/00
[52] U.S. Cl. ........................................ 29/451; 29/789; 29/235; 52/405
[58] Field of Search ................. 29/235, 451, 789, 797; 52/405

[56] References Cited

U.S. PATENT DOCUMENTS

| | | | |
|---|---|---|---|
| 1,733,610 | 10/1929 | Leipert | 29/235 X |
| 2,199,112 | 4/1940 | O'Leary | 52/405 |
| 2,361,783 | 10/1944 | McLaughlin | 29/235 UX |
| 3,139,677 | 7/1964 | Goldstein | 29/451 |
| 3,343,251 | 9/1967 | Augsburger | 29/451 |
| 3,546,833 | 12/1970 | Perreton | 52/405 |

*Primary Examiner*—Charlie T. Moon
*Attorney, Agent, or Firm*—Silverman, Cass & Singer

[57] ABSTRACT

A method and an apparatus for facilitating the filling of insulation material into cavities (11) in hollow blocks (10). The apparatus comprises one or several drums (14,15), which are arranged over a conveying means moving blocks past the apparatus. Through the drums pre-cut pieces (12) of insulation material are passed toward the block. In each drum (14,15) a press plate (18) further is provided. Each drum is terminated downwardly by a laterally movable plate (16), which at each drum is provided with an opening (17) having a smaller width than the passageway. A reciprocating mechanism (22) is provided to move the press plate (18) to the rear wall (14) of the drum, so that the lowermost piece (**12*a*) of insulation material is compressed, for example to half its thickness. An air distribution box (19) at the upper edge of the press plate includes air supply lines (20) and projects slightly in front of the press plate, so that the lower portion of the insulation piece (12*b*) lying above will be compressed more forcefully than the piece, which is about to be pressed out of the drum (14,15) and into the block (10). Subsequent to completed compressing movement, compressed air is ejected through openings (21) in the air box (19), whereby the compressed lowermost piece (12*a*) is pressed over in the block. The lower more forcefully compressed portion of the insulation piece (12*b***) lying above acts as a dam and prevents the loss of compressed air.

13 Claims, 4 Drawing Figures

METHOD AND APPARATUS FOR PACKING INSULATION MATERIAL IN HOLLOW BLOCKS

Figure 1:
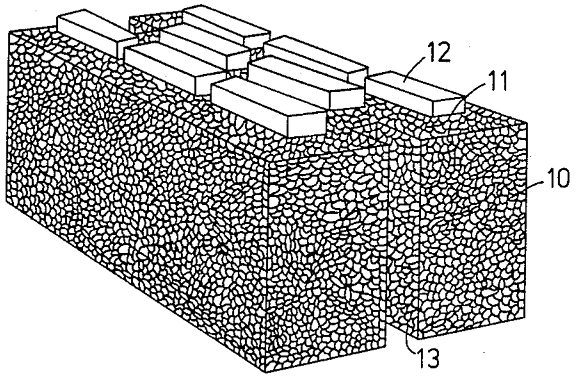

In the construction industry various types of hollow blocks are used which now to a great extent contain haydite pellets. In order to increase the heat-insulation properties of the block, the cavities therein can be filled with insulation material.

The method of filling the cavities can vary somewhat, depending on the type of the insulation material, i.e. whether a material is used which, like for example mineral wool, has a defined consistency, or a chemical material, which entirely or partially is foamed in the cavity.

The present invention relates to the handling of the first-mentioned type of material, and its object is to provide a method and an apparatus, which make it possible to rapidly and safely fit pre-cut pieces of compressible insulation material, for example mineral wool.

The present invention, thus, relates to a method of introducing into hollow blocks pre-cut pieces of compressible insulation material, comprising the introduction of said pieces into a drum and to pass one piece to a cavity in the block. The method is characterized in that the piece is compressed transversely to its longitudinal direction, that a pressure difference is established between the end of the piece which is located closest to the hollow block and the opposed end of the piece, which pressure is lowest at said firstmentioned end, whereby a force on said piece is produced, so that the piece in compressed state is introduced into a block cavity located beneath the drum.

According to a preferred embodiment of the method of the inventions at least one material piece is introduced into the drum above the material piece to be introduced into the hollow block, so that said piece lying above also is compressed transversely to its longitudinal direction at least as regards its portion located closest to the piece lying beneath. The piece lying above is compressed to a higher degree than the piece lying beneath, and compressed air is supplied adjacent to the upper edge of the piece lying beneath.

It is also possible, though not preferable, to introduce at the upper end of the material piece lying beneath a sealing element instead of an additional compressed material piece lying above.

The invention also relates to an apparatus for packing pre-cut pieces of a compressible insulation material into hollow blocks, comprising a drum, which passes material pieces to cavities in the block. The apparatus includes a press plate, which is movable laterally relative to the drum and has substantially the same height as the cavity. Means are provided for moving the press plate in lateral direction into the drum for compressing a material piece, and air distribution is provided to supply compressed air in, connection to the upper end of the material piece subsequent to the compressing movement.

According to a preferred embodiment of the invention, the apparatus further is characterized in that the air distribution member is attached to said press plate, that it has a greater extension into the drum than the press plate and is provided with at least one outflow opening in connection to the level, at which the upper end surface of a material piece to be passed out of the drum is located.

Figure 4:
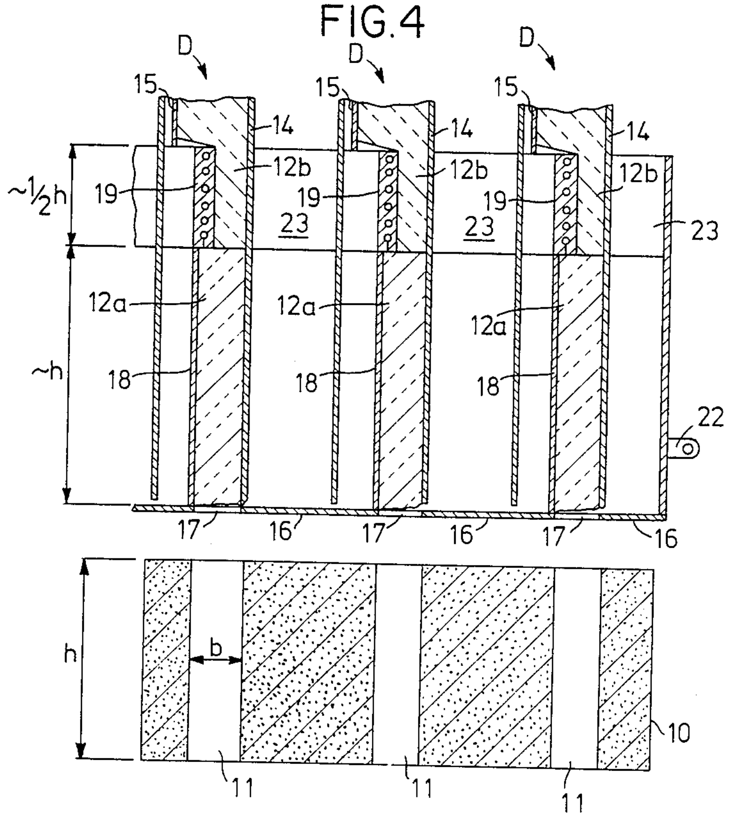
Figure 2:
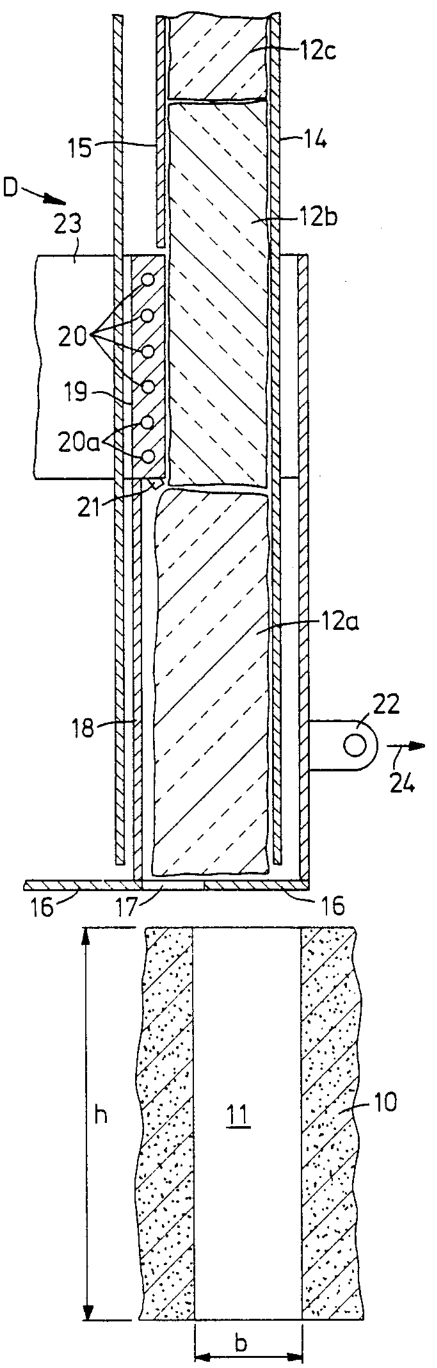
Figure 3:
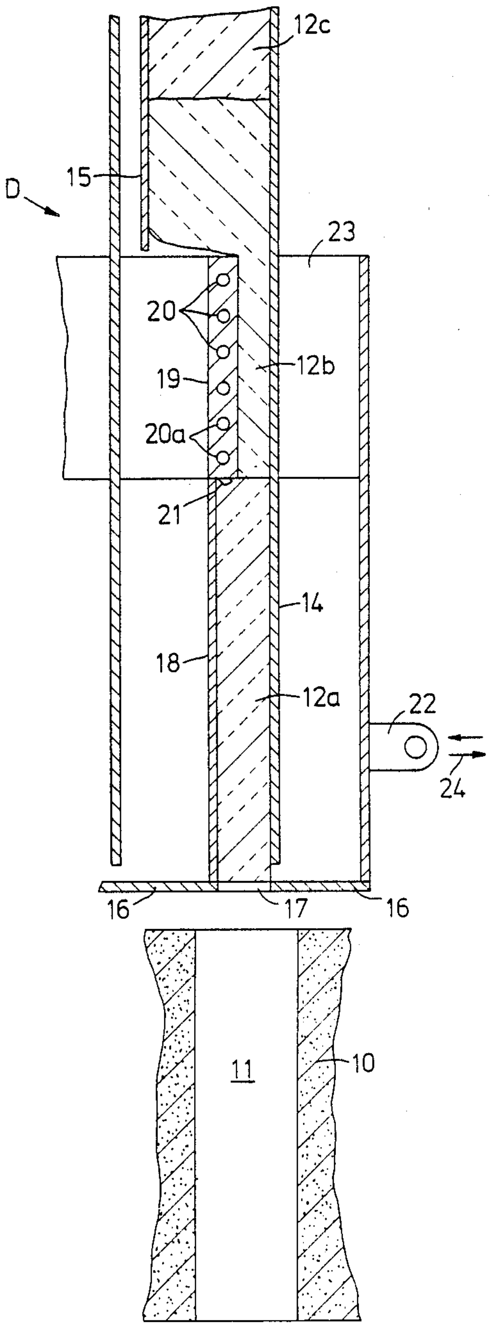

The invention is described in greater detail in the following, with reference to a preferred embodiment shown in the accompanying drawings, in which FIG. 1 is a perspective view of a hollow block provided with insulating filling, FIG. 2 is a section through the lower end of a drum immediately prior to the compressing movement, FIG. 3 is the same section after completed compressing movement, and FIG. 4 shows schematically an arrangement for actuating three clamping plates simultaneously.

FIG. 1 shows a hollow block of relatively conventional type, which is manufactured of haydite pellets and provided with three rows of cavities 11, into which pieces 12 of heat-insulation material are inserted. The block is provided at each short side with a groove 13 having the same dimension as half a cavity 11. In bricking, an insulation piece 12 can be positioned in grooves 13 facing toward each other. The pieces of insulation 12 can be inserted in different ways. Advantageously it is arranged so that the insulation on the construction site will project upward above the upper surface of the block. After insertion into the cavity, the insulation is compressed to align with the upper surface of the block. For their transport to the construction site, the blocks are packed so that there is no possibility for the filling to expand before the package is opened on the construction site.

The preferred insulation material is mineral wool, which has good insulation properties and can be formed into pieces of desired size. It also can be compressed, but later resumes its original shape. Using conventional equipment suitable pieces are cut from slabs or mats of mineral wool and transported to drums D illustrated in FIGS. 2–4, which are directed downward to the blocks 10. The blocks are transported past a station, where the insulation is inserted. The important objective is to simply and efficiently transfer the insulation pieces from the drums D to the cavities 11 in the block 10.

Cut-to-size pieces of mineral wool can manually be inserted into the drums D, but preferably one or more conveying means of conventional type are utilized for loading the pieces. Distribution members extending from a conveyor or conveyors are provided to distribute the pieces from a conveyor to two or more drums D. Such a distribution member may consist of a tubular member, which is hingedly suspended about its infeed end, and the outfeed end is directed in steps to the respective drum, into which the pieces are to be fed.

For a block of the kind shown in FIG. 1, preferably three rows of drums D are utilized, of which the outer rows include three drums D and the central row two drums. Of course, the number of drums D may be variable.

FIGS. 2 and 3 show the lower portion of a drum D positioned above a portion of a block 10 in alignment with a cavity 11. Each drum D comprises a stationary rear wall 14 and a front wall 15, which from a distributor (not shown) extends downward to the block 10. The distance between the walls 14 and 15 corresponds to the width of the cavity 11 in the block, so that the pieces 12 can slide down to the block by their own weight. In the Figures, three pieces **12*a*, 12*b* and 12*c* are shown, and in FIG. 2 the drum D is in position for receiving a block 12*a* in the lower drum D portion, while in FIG. 3 the drum D is shown with said lower insulation piece 12*a* completely compressed and prepared for insertion into cavity 11**.

The bottom of the drum D is formed by a plate 16 movable in lateral direction and provided with an opening 17. The opening 17 has a width, which is smaller than the width of the cavity 11, and preferably has a width, which is about half the width b of the cavity 11. The width of the opening, thus, corresponds to the width of a compressed material piece. The opening 17 is so situated in the plate 16 that, when the plate is in the starting position shown in FIG. 2, the opening 17 forms a support surface in front of the rear wall for the lowermost insulation piece 12*a*, which thereby is prevented from sliding out of the drum D.

The opening 17 in the plate 16, thus, has a width corresponding to about half the width of the cavity, and the means for moving the plate have a stroke of about half the cavity width. The rear wall 14 of the drum D preferably is stationary and extends downward all the way to the plate. The entire arrangement is designed so that an imagined extension of the rear wall coincides with one long side of the cavity.

The pieces of mineral wool in uncompressed state have the same or approximately the same dimensions as the said passageway 11 or, as indicated in the introductory portion above, possibly shall be slightly higher than the cavity 11 so as to be capable to expand out of the cavity 11 in connection with the bricking operation.

In connection to opening 17 a press plate 18 is mounted on the plate 16 and movable therewith. The press plate 18 has a height corresponding to the insulation piece 12*a*, i.e. in principal equal to the height of the cavity 11. To the upper edge of the press plate 18 an air distribution member 19 is connected which has a height corresponding to about half the height of the cavity and, thus, extends upward a distance along the overlying piece 12*b* in the drum D. The air distribution member 19 has a greater extension into the drum D than the press plate 18 and is provided with at least one outflow opening 20*a* in connection to the level, on which the upper end surface of a material piece 12*a* to be discharged from the drum D is located.

In a block having several rows of cavities, the plate 16 preferably covers the entire block and all of the press plates move at the same time. Air boxes at the same row of cavities, transversely to the direction of movement of the plate preferably are coupled to one compressed air source in common.

As in some cases there will be three drums D aligned one after the other, and the press plates with the air distribution members preferably are moved simultaneously over the entire block, in said members a number of channels 20 for the supply of compressed air are provided, of which channels two, 20*a*, are provided with ejection openings directed downward along the press plate 18 at the section of the apparatus shown in FIGS. 2 and 3, while the remaining ones in pairs service adjacent drums D in the row. The ejection openings open in connection to the upper edge of the compressed material piece 12*a*.

Prior to its insertion into the cavity D, the insulation piece is compressed in such a manner, that the press plate 18 and plate 16 are moved in lateral direction as indicated by the arrow 24. In the embodiment shown, the press plate 18 is mounted on the plate 16, but it is obvious that various actuation mechanisms for these two plates can be provided for and the movement be caused to take place simultaneously.

The actuation mechanism is here illustrated in a simple way by a connection 22, which is connected to a mechanism carrying out a reciprocatory movement, such as an air cylinder or similar device. The stroke here is chosen so that the press plate 18 is moved in lateral direction through a distance corresponding to half the width of the cavity 11, i.e. the piece 12*a* will be compressed to about half the original thickness.

The air distribution member 19 projects ahead of the press-plate 18, i.e. it has an extension into the drum D through a distance corresponding to about one fourth of the width of the cavity 11. As a result, the lower portion of the insulation piece 12*b* lying above will be more compressed than the piece 12*a*. After completed compression movement of the press plate 18, compressed air supplied through the nozzles 21 flows down in front of the press plate 18 and presses the compressed mineral wool piece down into the cavity 11. The compressed lower portion of the insulation piece 12*b* lying above thereby acts as an efficient barrier preventing the air from blowing upward, so that the entire force in the compressed air can be utilized for working on the insulation piece 12*a* lying beneath. The rear wall 14 of the drum D is arranged to align with one side wall in the cavity 11, or preferably be located slightly in front of said side wall. When the piece 12*a* is fully compressed, the opening 17 is arranged to extend from the rear wall 14 to the press plate 18 and to provide downward passage of the comprised piece 12*a* therethrough. The press plate 18 and the air distribution member 19 move in a recess in the front wall 15, and the air distribution members preferably can be connected by a beam 23, which in its turn is connected to the plate 16 and actuation mechanism 22.

FIG. 4 shows a detail of the filling mechanism comprising three press plates 18 connected to the actuation mechanism 22. Here also the height, h, of the block and the width, b, of the cavity 11 are indicated as well as corresponding dimensions in the movable parts of the drums D.

The plate 16 preferably is formed so as to cover the entire block 10, whereby a simple and rational filling of the insulation material is achieved. The horizontal conveying means moving the blocks past the filling station is controlled so that the blocks stop one after the other below the filling device for a period of time which is sufficiently long for completing a filling operation.

In an alternative embodiment of the invention, the drum D is caused to sealingly abut the hollow block 10 at the opening to a cavity in the hollow block by means of suitable sealing members, for example rubber strips, and at such abutment to produce a vacuum by means of a vacuum source, for example a vacuum pump, below the hollow block coupled to the cavity.

The embodiment referred to above is of such type that the drum D is maintained at a substantially constant height relative to the hollow blocks. The invention can be employed in a modified embodiment, in which the lower portion of the drum is suitably dimensioned for insertion into a cavity or a part thereof, and while the material piece is being pushed out, the drum is retracted from the cavity.

The embodiment shown, thus, is only an example of the invention, and the details can be varied in many ways. The actuating mechanism for the bottom plate and press plates can be designed in different ways and, when the manufacture is highly automated, it is of course possible to advance several blocks arranged side-by-side in which case the filling mechanism is provided with a corresponding number of drum D.

The invention is not restricted to the embodiments specifically described, but can be varied within the scope of the attached claims.

I claim:

1. A method for filling hollow blocks with pre-cut pieces of compressible insulation material, comprising:

A. positioning a drum containing pieces of said insulation material above a conveying means for moving blocks beneath said drum;

B. compressing an entire first piece of said material transversely to the longitudinal dimension of said first piece aligned with a cavity in a block beneath the drum; and thereafter C. establishing a lower pressure through the hollow block upon the longitudinal end of the first piece located closest to the block than a second pressure upon the opposite end of the first piece remote from the block, whereby the resulting pressure differential pulles the compressed first piece into said cavity.

2. The method as claimed in claim 1, further comprising positioning a second piece of said material above said first piece so that the respective longitudinal dimensions of said first and second pieces are in end-to-end alignment, compressing at least a portion of said second piece lying immediately above said first piece to a higher compression than the compression of said first piece, and injecting compressed air against said opposite end of said first piece for establishing said pressure differential in step C.

3. The method as claimed in claim 1, further comprising positioning a bottom of said drum in sealing abutment with said block, and wherein said establishment of said pressure differential comprises applying a vacuum to said cavity to draw said first piece into said cavity.

4. The method as claimed in claim 2, wherein said compression comprises moving a press plate oriented parallel to said longitudinal dimensions of said first and second pieces, and said injection comprises injecting said compressed air through an air distribution member attached as an upper portion of said press plate and projecting therefrom to produce said higher compression of said second piece.

5. Apparatus for filling cavities in hollow blocks with pre-cut pieces of compressible insulation material comprising:

A. a drum for containing at least one said piece;

B. a press plate contained within said drum, said press plate being laterally movable in relation to the drum to entirely compress said piece within said drum; and C. means for injecting air into said drum and for direction of the air against an end of said piece to force the compressed piece out of said drum and into said cavity.

6. The apparatus as claimed in claim 5, further comprising a laterally movable plate defining the bottom of said drum, said plate having an opening therethrough, said opening being generally dimensioned to correspond with the compressed end of said piece for passage thereof through said opening and into a generally larger dimensioned cavity.

7. The apparatus as claimed in claim 5 or 6, wherein said air injection means comprises an air distribution member attached to said press plate, said member projecting from said press plate in the direction of said compression, and said member including at least one opening located for effluent air therethrough adjacent said end of said piece.

8. The apparatus as claimed in claim 7, wherein said member has a height corresponding to approximately one-half the height of the cavity and wherein said member projects from the press plate a distance corresponding to approximately one-quarter of the width of the cavity.

9. The apparatus as claimed in claim 6, further comprising means for reciprocating said press plate through a stroke length of approximately one-half the width of the cavity, and wherein the opening in said bottom plate has a width corresponding to approximately one-half the width of the cavity.

10. The apparatus as claimed in claim 6 or 9, wherein said press plate is mounted on said bottom plate for movement therewith.

11. The apparatus as claimed in claim 5 or 6, wherein said drum includes a stationary rear wall extending generally perpendicular to and narrowly spaced from said bottom plate, for longitudinal alignment with the side of said cavity.

12. The apparatus as claimed in claim 5 or 6, comprising a plurality of said drums and a plurality of said respective press plates, and means for moving said press plates simultaneously.

13. The apparatus as claimed in claim 12, wherein said means for air injection comprises a plurality of air distribution members mounted respectively on said press plates, each said member having at least one opening for exit of said air, said opening directing said air transverse to the direction of movement of said bottom plate, said members being connected to a common source of compressed air.

* * * * *